(12) United States Patent
Heor et al.

(10) Patent No.: US 7,505,390 B2
(45) Date of Patent: Mar. 17, 2009

(54) COMPATIBLE OPTICAL PICKUP

(75) Inventors: Tae-youn Heor, Suwon-si (KR); Soo-han Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 570 days.

(21) Appl. No.: 10/786,073

(22) Filed: Feb. 26, 2004

(65) Prior Publication Data

US 2004/0165520 A1    Aug. 26, 2004

(30) Foreign Application Priority Data

Feb. 26, 2003    (KR) .................. 10-2003-0011955

(51) Int. Cl.
   *G11B 7/12*    (2006.01)
(52) U.S. Cl. .................. 369/112.24; 369/112.03; 369/44.32; 359/719
(58) Field of Classification Search ............ 369/112.24, 369/112.23, 112.26, 44.32, 112.03, 44.14, 369/112.01; 359/719
   See application file for complete search history.

(56) References Cited

U.S. PATENT DOCUMENTS

| | | | |
|---|---|---|---|
| 5,235,581 A | | 8/1993 | Miyagawa et al. |
| 5,703,856 A | | 12/1997 | Hayashi et al. |
| 5,703,862 A | | 12/1997 | Lee et al. |
| 5,909,424 A | | 6/1999 | Lee et al. |
| 5,930,214 A | * | 7/1999 | Kasahara et al. ........... 369/53.2 |
| 6,021,107 A | * | 2/2000 | Tsukahara et al. ......... 720/669 |
| 6,043,912 A | | 3/2000 | Yoo et al. |
| 6,147,955 A | * | 11/2000 | Lee et al. ............... 369/112.26 |
| 6,304,526 B1 | * | 10/2001 | Nagashima et al. ....... 369/44.23 |
| 6,314,064 B1 | * | 11/2001 | Ueda et al. ............... 369/44.23 |
| 6,324,133 B1 | * | 11/2001 | Ichimura ................. 369/44.27 |

(Continued)

FOREIGN PATENT DOCUMENTS

CN    1196816    10/1998

(Continued)

OTHER PUBLICATIONS

Korean Office Action.

(Continued)

*Primary Examiner*—Wayne R Young
*Assistant Examiner*—Thomas D Alunkal
(74) *Attorney, Agent, or Firm*—Staas & Halsey LLP

(57) ABSTRACT

A compatible optical pickup includes a light source which emits a first light beam having a wavelength for a first recording medium; a twin light source which emits second and third light beams respectively having wavelengths for second and third recording media; a first objective lens which condenses the first light beam to form a light spot for recording and/or reproduction of the first recording medium; a second objective lens which condenses the second and third light beams to form light spots for recording and/or reproduction of the second and third recording media; an actuator which drives the first and second objective lenses; a first photo-detector which receives the first light beam reflected from a recording medium to detect an information signal and/or an error signal; and a second photo-detector which receives the second and third light beams reflected from a recording medium to detect information signals and/or error signals.

31 Claims, 5 Drawing Sheets

U.S. PATENT DOCUMENTS

| | | | |
|---|---|---|---|
| 6,515,955 B2 * | 2/2003 | Takeuchi | 369/112.08 |
| 6,775,065 B2 * | 8/2004 | Hayashi et al. | 359/569 |
| 6,895,593 B2 * | 5/2005 | Kim et al. | 720/669 |
| 2002/0054559 A1 * | 5/2002 | Choi | 369/244 |
| 2003/0103441 A1 * | 6/2003 | Kim et al. | 369/244 |

FOREIGN PATENT DOCUMENTS

| | | |
|---|---|---|
| CN | 1306273 | 8/2001 |
| CN | 1350686 | 5/2002 |
| JP | 11-185282 | 7/1999 |
| KR | 100255233 | 2/2000 |

OTHER PUBLICATIONS

Chinese Office Action for Appln. No. 2004100352933 dated Jul. 22, 2005.

* cited by examiner

COMPATIBLE OPTICAL PICKUP

CROSS-REFERENCE TO RELATED APPLICATIONS

This application claims the benefit of Korean Patent Application No. 2003-11955, filed on Feb. 26, 2003 in the Korean Intellectual Property Office, the disclosure of which is incorporated herein in its entirety by reference.

BACKGROUND OF THE INVENTION

1. Field of the Invention

The present invention relates to a compatible optical pickup, and more particularly, to a compatible optical pickup which can be compatibly used for three types of recording media by using light beams with different wavelengths.

2. Description of the Related Art

An optical recording and/or reproducing apparatus records information on and/or reproduces information from an optical information storage medium, such as an optical disc, by using a light spot condensed by an objective lens. The recording capacity of the optical disc is determined by a size of the light spot. A size S of a light spot is determined by a wavelength $\lambda$ of the light and a numerical aperture (NA) of the objective lens as represented in Equation 1:

$$S \propto \lambda/NA \quad (1)$$

Accordingly, in order to reduce the size of the light spot focused on an optical disc and to increase the density of the optical disc, a short wavelength light source (such as a blue violet laser) and an objective lens (such as an objective lens with an NA of more than 0.6) are required.

Also, when $\theta$ denotes a tilt angle of the optical disc, n denotes a refractive index of the optical disc, and d denotes the thickness of the optical disc, a coma aberration $W_{31}$ caused by the tilt of the optical disc can be represented as in Equation 2:

$$W_{31} = -\frac{d}{2} \frac{n^2(n^2-1)\sin\theta\cos\theta}{(n^2-\sin^2\theta)^{5/2}} NA^3 \quad (2)$$

wherein the refractive index n and the thickness d of the optical disc refer to a refractive index and the thickness of an optical medium ranging from a light incidence surface to a recording surface.

As can be seen in Equation 2, in order to secure a tolerance by the tilt of the optical disc, the thickness of the optical disc must be reduced with an increase in the NA of the objective lens for high density. For example, a compact disc (CD) has the thickness of 1.2 mm, and the thickness of a digital versatile disc (DVD) is reduced to 0.6 mm. A next generation DVD with recording capacity of more than 20 GB, which is currently in progress of standardization and development and stores high definition (HD) moving picture information, is highly likely to be manufactured to the thickness of 0.1 mm. Of course, for the CD, the NA of the objective lens is 0.45, and for the DVD, the NA of the objective lens is increased to 0.6. However, for the next generation DVD, the NA of the objective lens is highly likely to increase to more than 0.6, and may be for example, 0.85. Also, in view of recording capacity, there is a high probability that a blue violet light source to emit blue violet light with a wavelength of about 405 nm will be used for the next generation DVD. When developing an optical information storage medium according to new standards, the compatibility with an existing optical information storage medium is problematic.

For example, since a reflectance of a writable DVD (DVD-R) and a writable CD (CD-R) is considerably reduced according to the wavelength, the use of a light source to emit light with wavelengths of 650 nm and 780 nm is indispensable. Accordingly, in terms of the compatibility with the DVD-R and the CD-R, an optical pickup used for the next generation DVD may adopt three light sources which emit light beams with different wavelengths.

SUMMARY OF THE INVENTION

An aspect of the present invention provides a compatible optical pickup which can be compatibly used for three types of optical information storage media with different recording densities and formats, by using three light beams with different wavelengths.

Additional aspects and/or advantages of the invention will be set forth in part in the description which follows and, in part, will be obvious from the description, or may be learned by practice of the invention.

According to an aspect of the present invention, a compatible optical pickup which can be compatibly used for first through third recording media having different recording densities and formats includes a single light source which emits a first light beam having a wavelength suitable for the first recording medium; a twin light source which emits second and third light beams respectively having corresponding wavelengths suitable for the second and third recording media; a first objective lens which condenses the first light beam to form a light spot for recording and/or reproduction of the first recording medium; a second objective lens which condenses the second and third light beams to form light spots for recording and/or reproduction of the second and third recording media; an actuator which drives the first and second objective lenses; a first photo-detector which receives the first light beam reflected from a recording medium to detect an information signal and/or an error signal; and a second photo-detector which receives the second and third light beams reflected from a recording medium to detect information signals and/or error signals.

According to an aspect of the invention, the actuator includes a single lens holder to hold the first and second objective lenses; and a magnetic circuit, which drives the single lens holder to drive the first and second objective lenses.

According to an aspect of the invention, the single lens holder installs the first and second objective lenses at different heights above an uppermost surface of the corresponding media.

According to an aspect of the invention, when WD1 is a working distance of one of the first and second objective lenses which has a short working distance and WD2 is a working distance of the other one of the first and second objective lenses which has a long working distance, the first and second objective lenses are installed to satisfy an Equation below so as to prevent one of the first and second objective lenses, which has the short working distance, from contacting a recording medium during loading of the recording medium and operation of the other one of the first and second objective lenses which has the long working distance:

WD2≧WD1

Basic Separating Distance of Objective Lens Having Short Working Distance with Respect to Recording Medium=$WD1+\alpha$ where, $\alpha=|WD2-WD1|\times(0.1\sim1.0)$.

According to an aspect of the invention, at least one of the first and second objective lenses have a wavefront aberration occurring mainly due to a tilt of the objective lens and a wavefront aberration occurring mainly due to a tilt of light incident on the objective lens to become a same type of aberration.

According to an aspect of the invention, one of the first through third recording media is a CD-family optical disc, another is a DVD-family optical disc, and a further is a next generation DVD-family optical disc having a higher recording density than a DVD.

According to an aspect of the invention, the next generation DVD-family optical disc has the thickness of about 0.1 mm, uses a blue violet beam for recording and/or reproduction of data, and uses an objective lens having a numerical aperture of at or more than 0.85.

BRIEF DESCRIPTION OF THE DRAWINGS

These and/or other aspects and advantages of the present invention will become more apparent and more readily appreciated from the following description of the embodiments thereof with reference to the accompanying drawings in which.

DETAILED DESCRIPTION OF THE EMBODIMENTS

Figure 1:
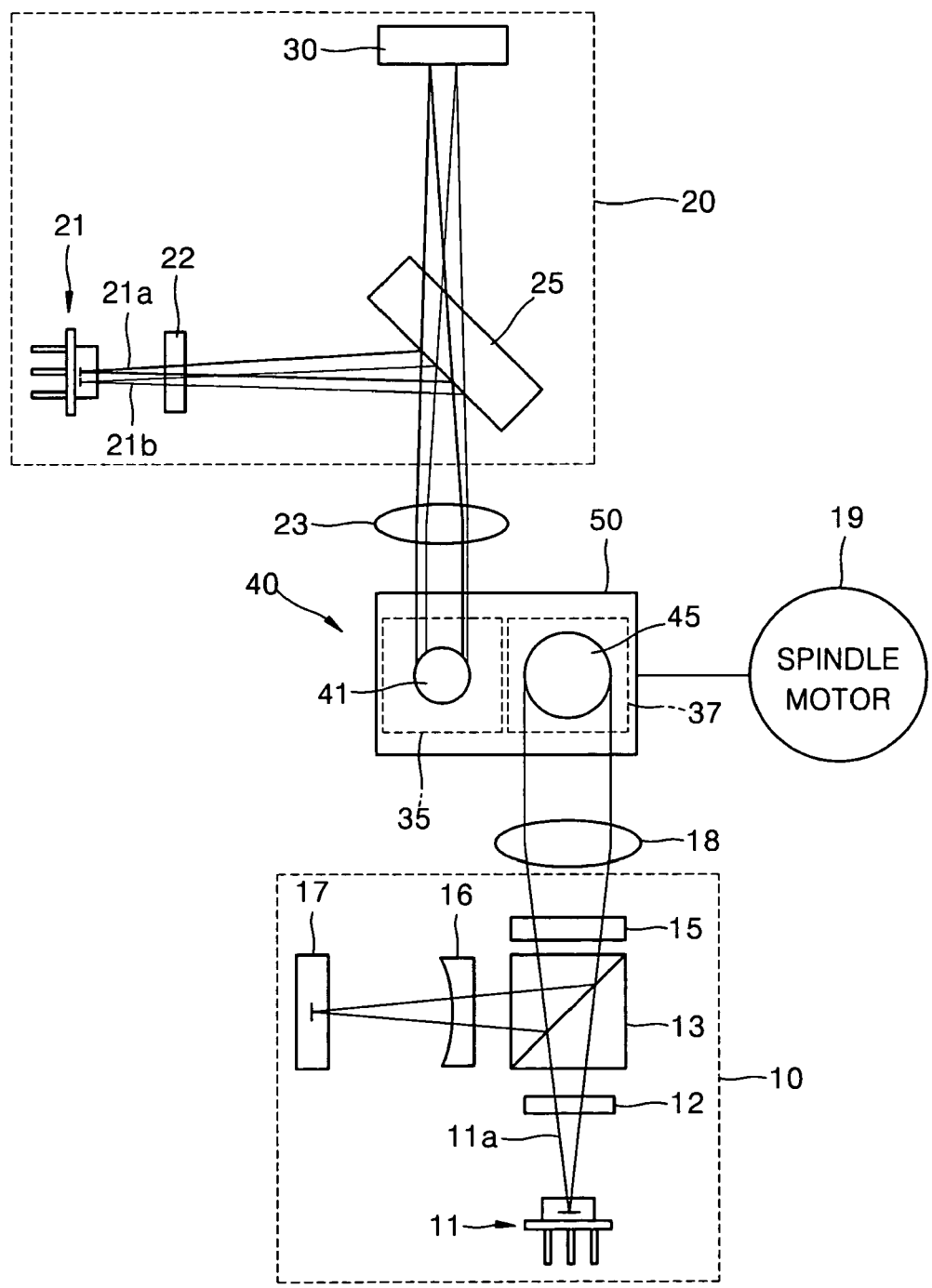
FIG. 1 is a schematic view showing the optical structure of an optical pickup according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

A compatible optical pickup according to an embodiment of the present invention has a structure which can be compatibly used for a next generation DVD-family optical disc (hereinafter referred to as a next generation DVD), a DVD-family optical disc (hereinafter referred to as a DVD), and a CD-family optical disc (hereinafter referred to as a CD) with different recording densities and formats. Here, one side of the next generation DVD has a recording capacity of more than 20 GB, more preferably, more than 23 GB. Examples of the next generation DVD include, but are not limited to, Blu-Ray discs and Advanced Optical Discs (AODs).

Figure 2:
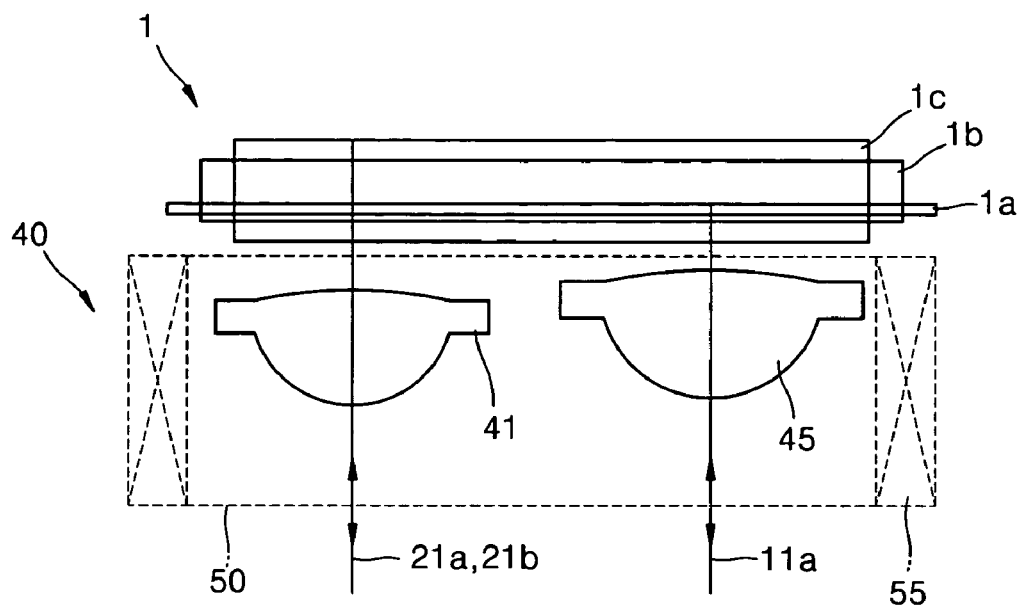
FIG. 2 is a schematic view showing paths through which light beams condensed by first and second objective lenses of FIG. 1 are irradiated onto optical discs with different thicknesses.

FIG. 1 is a schematic view showing the optical structure of a compatible optical pickup, according to an embodiment of the present invention. FIG. 2 is a schematic view showing optical paths through which light beams, condensed by first and second objective lenses 45 and 41 of FIG. 1, are irradiated onto a received one of the next generation DVD 1a, a DVD 1b, and a CD 1c with different thicknesses (collectively referred to as an optical disc 1). Referring to FIGS. 1 and 2, the compatible optical pickup uses a high-density optical system for the next generation DVD 1a and a low-density optical system for the DVD 1b and the CD 1c. The optical pickup system shares an actuator 40 and is compatibly used for a plurality of optical discs with different recording densities and thicknesses.

The compatible optical pickup includes an optical unit, the first and second objective lenses 45 and 41, and the actuator 40. The optical unit emits first, second, and third light beams 11a, 21a, and 21b with suitable wavelengths for the next generation DVD 1a, the DVD 1b, and CD 1c toward the optical disc 1. The optical unit further receives the first, second, and third light beams 11a, 21a, and 21b reflected from the optical disc 1 to detect information signals and/or error signals. The first and second objective lenses 45 and 41 condense incident light beams to focus the incident light beams as a light spot on a recording surface of the optical disc 1. The actuator 40 moves the first and second objective lenses 45 and 41 in a focusing direction and/or a tracking direction according to the detected error signals. The optical disc 1 shown represents the one of the CD 1c, DVD 1b, and next generation DVD 1a being recorded and/or reproduced by the optical unit.

As shown in FIG. 1, the compatible optical pickup has a structure in which the first, second, and third light beams 11a, 21a, and 21b emitted from the optical unit are reflected from reflective mirrors 37 and 35 toward the first and second objective lenses 45 and 41. However, it is understood that the compatible optical pickup can also have a structure in which ones of the first, second, and third light beams 11a, 21a, and 21b emitted from the optical unit are directly incident on the first and second objective lenses 45 and 41 such that the reflective mirrors 37 and/or 35 are not required.

The optical unit includes a first optical unit 10, a second optical unit 20, a first collimating lens 18, and a second collimating lens 23. The first optical unit 10 emits the first light beam 11a with a wavelength suitable for the next generation DVD 1a and receives the first light beam 11a reflected from the optical disc 1, which is the next generation DVD 1a when received in the apparatus, to detect an information signal and/or an error signal. The second optical unit 20 emits the second and third light beams 21a and 21b with corresponding wavelengths suitable for the DVD 1b and the CD 1c, and receives the second and third light beams 21a and 21b reflected from the optical disc 1, which is the received one of the DVD 1b and CD 1c, to detect information signals and/or error signals. The first collimating lens 18 is disposed in an optical path between the first optical unit 10 and the reflective mirror 37 for the next generation DVD 1a. The second collimating lens 23 is disposed in an optical path between the second optical unit 20 and the reflective mirror 35. When the compatible optical pickup has the above-described structure, the compatible optical pickup can be compatibly used for each of the next generation DVD 1a, the DVD 1b, and the CD 1c when received in the recording and/or reproducing apparatus such as that shown in FIG. 7.

As shown in the embodiment in FIG. 1, the first optical unit 10 includes a blue violet light source 11, a polarization beam splitter (PBS) 13, a quarter wave plate 15 with respect to the wavelength of the first light beam 11a, a photo-detector 17, and a sensing lens 16. The light source 11 emits the first light beam 11a with the blue violet wavelength suitable for the next generation DVD 1a. For example, the emitted wavelength is a wavelength of 405 nm according to an aspect of the invention. The PBS 13 transmits the first light beam 11a or reflects the first light beam 11a according to a polarization state. Specifically, the PBS 13 transmits the first light beam 11a emitted from the first light source 11 to be received at the optical disc 1, and reflects the first light beam 11a reflected by the optical disc 1 to be received at the photo-detector 17. The quarter wave plate 15 changes the polarization state of the first light beam 11a so as to control the transmission/reflection of the first light beam 11a by the PBS 13. The photo-detector 17 receives the first light beam 11a reflected from the optical disc 1 and reflected by the PBS 13 to detect the information signal and/or the error signal. The sensing lens 16 is disposed between the PBS 13 and the photo-detector 17 and focuses the first light beam 11a onto the photo-detector 17.

While not required in all aspects, the sensing lens 16 may be an astigmatic lens which generates an astigmatism in the first light beam 11a so as to detect a focus error signal using an astigmatic method. However, it is understood that other types of lenses can be used, and other methods can be performed to detect a focus and/or tracking error.

As shown in FIG. 1, the first optical unit 10 further includes a grating 12 which diffracts the first light beam 11a emitted from the single light source 11 into three or more beams. In this way, the grating 12 generates sub beams used to detect a tracking error signal using a 3-beam method or a differential push-pull (DPP) method. However, the grating 12 need not be used in all aspects. The structure of the photo-detector 17 usable for detecting a tracking error signal using a known 3-beam method or the DPP method is known, and will not be explained and shown in detail herein.

While not required in all aspects, the first optical unit 10 may include a monitor photo-detector (not shown) that detects the first light beam 11a which has been emitted from the light source 11 and a portion of which has been partially reflected by the PBS 13 for controlling the output light power of the of the light source 11. The first optical unit 10 may also further include a condensing lens (not shown) which properly condenses the reflected portion of the first light beam 11a onto the monitor photo-detector.

According to another aspect of the invention, instead of including the PBS 13 and the quarter wave plate 15 for changing the proceeding path of the incident first light beam 11a according to the polarization state, the first optical unit 10 may include a plate-type beam splitter or cubic-type beam splitter which transmit and reflect the first light beam 11a in a predetermined ratio.

According to another aspect, the first optical unit 10 may be a hologram optical module for a blue violet wavelength suitable for the next generation DVD 1a, for example, a wavelength of 405 nm. The hologram optical module includes a light source which emits a light beam with a predetermined wavelength, a photo-detector which is disposed at a side of the light source and receives light reflected from an optical disc to detect an information signal and/or an error signal, and a hologram element which directly transmits light emitted from the light source and diffracts light reflected from the optical disc into a $+1^{st}$-order or $-1^{st}$-order beam toward the photo-detector. While not required, it is preferable that the grating 12 and the hologram optical module are incorporated into a single body.

As shown, the second optical unit 20 includes a twin light source 21, a plate-type beam splitter 25, and a photo-detector 30. The twin light source 21 emits the second light beam 21a with a red wavelength suitable for the DVD 1b (for example, a wavelength of 650 nm). The twin light source 21 further emits the third light beam 21b with an infrared wavelength suitable for the CD 1c (for example, a wavelength of 780 nm). The plate-type beam splitter 25 transmits and reflects the second and third light beams 21b and 21c in a predetermined ratio so as to reflect the second and third light beams 21b and 21c to be received at the optical disc 1, and to transmit the second and third light beams 21b and 21c reflected from the optical disc 1 towards the photo-detector 30. The photo-detector 30 receives the second and third light beams 21a and 21b reflected from the optical disc 1 to detect the information signals and/or error signals. However, it is understood that the plate-type beam splitter 25 could instead transmit the second and third light beams 21b and 21c to be received at the optical disc 1, and reflect the second and third light beams 21b and 21c to be received at the photo-detector 30.

The shown second optical unit 20 includes a grating 22 which diffracts the second and third light beams 21a and 21b to generate sub beams so as to detect a tracking error signal using the 3-beam method or the DPP method. The grating 22 is disposed between the twin light source 21 and the plate-type beam splitter 25. However, the grating 22 need not be used in all aspects of the invention.

According to an aspect of the invention, the second optical unit 20 may further include a sensing lens (not shown) disposed between the plate-type beam splitter 25 and the photo-detector 30 and performs a function identical or similar to that of the sensing lens 16 of the first optical unit 10. The second optical unit 20 may further include a monitor photo-detector (not shown) which monitors an output amount of the second light beam 21a and/or the third light beam 21b.

While not required in all aspects, twin light source 21 may be a twin laser diode (LD) into which two semiconductor lasers for emitting light beams with different wavelengths are modularized. However, other types of light sources can be used. Additionally, the light source 21 could be individual light sources whose optical axes are aligned using wavelength dependent mirrors and/or surfaces.

Instead of including the plate-type beam splitter 25 as an optical path changing device, it is understood that the second optical unit 20 may include the PBS 13 and the quarter wave plate 15 of the first optical unit 10.

Figure 3:
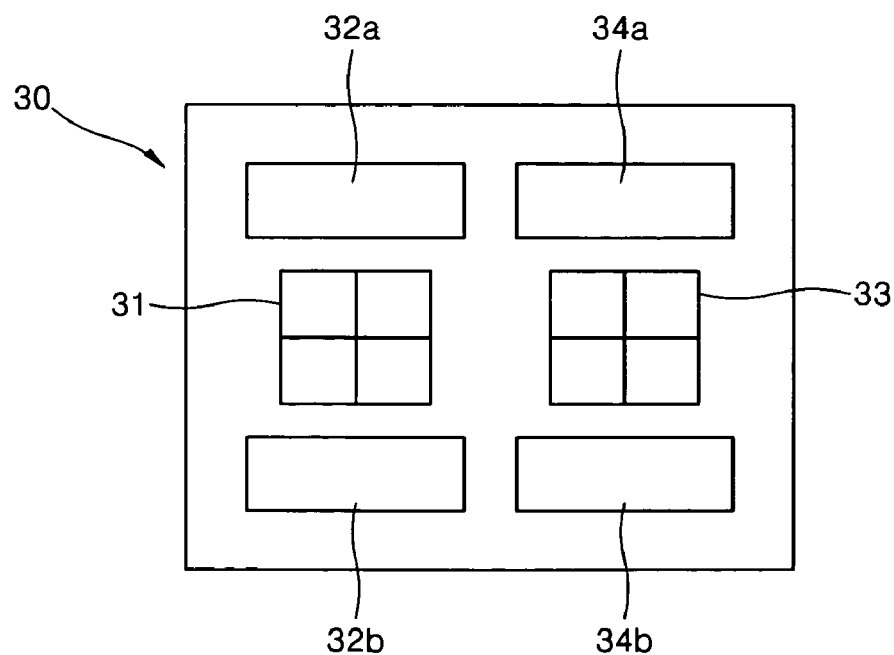
FIG. 3 is a schematic plan view of an embodiment of a second photo-detector of FIG. 1.
Figure 4:
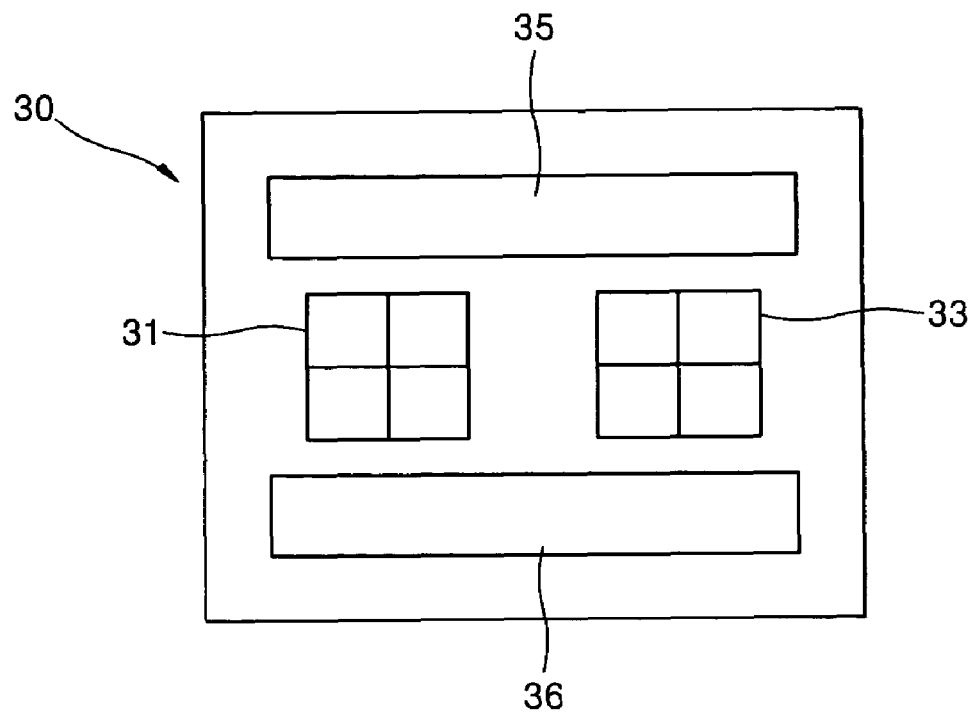
FIG. 4 is a schematic plan view of another embodiment of the second photo-detector of FIG. 1.

The shown second and third light beams 21a and 21b are emitted from the twin light source 21 so that their central axes are spaced apart from each other. The grating splits the received second and third light beams 21a, 21b. According to an aspect of the invention, the three beams split by the grating 12 are detected by a photo-detector 30 having, for example, structures as shown in FIGS. 3 and 4. Referring to FIG. 3, the photo-detector 30 includes a quadrant main photo-detector 31, a pair of sub photo-detectors 32a and 32b disposed beside two sides of the quadrant main photo-detector 31, a quadrant main photo-detector 33, and a pair of sub photo-detectors 34a and 34b disposed beside two sides of the quadrant main photo-detector 33. The quadrant main photo-detector 31 detects the second light beam 21a, and the quadrant main photo-detector 33 detects the third light beam 21b. The quadrant main photo-detectors 31 and 33 are used to detect information signals recorded on the optical disc 1 and the focus error signal. The sub photo-detectors 32a, 32b, 34a, and 34b are used to detect the tracking error signal using the 3-beam method. The quadrant main photo-detectors 31 and 33 and the sub photo-detectors 32a, 32b, 34a, and 34b may also be used to detect the tracking error signal using the DPP method.

The structure of the photo-detector 30 of FIG. 3 is suitable for detecting an error signal by using three beams into which both the second and third light beams 21a and 21b are split, in the use of the DVD 1b and the CD 1c, and may be modified into various forms. For example, an aspect of the invention includes the photo-detector 30 shown in FIG. 4 in which a pair of sub photo-detectors 35 and 36 is disposed beside two sides of both the quadrant main photo-detectors 31 and 33. When using the DVD 1b and the CD 1c, the photo-detector 30 shown in FIG. 4 can be used when both the second and third light beams 21a and 21b are split into the three beams to detect the error signals, or can be used when only one of the second and third light beams 21a and 21b are split into three beams such that the quadrant photo-detector 31, 33 corresponding to the other of the second and third light beams 21a and 21b is used to detect the error signal with respect to the other one of the second and third light beams 21a and 21b.

Even when both the second and third light beams 21a and 21b are split and then used to detect the error signals, the photo-detector 30 may include the sub photo-detectors 35 and 36 as shown in FIG. 4. This is because the compatible optical pickup according to an aspect of the present invention uses only the second light beam 21a during recording on and/or reproduction from the DVD 1b as the optical disc 1, and only the third light beam 21b during recording on and/or reproduction from the CD 1c as the optical disc 1. The sub photo-detector 35 corresponds to a single body into which the sub photo-detectors 32a and 32b are incorporated. The sub photo-detector 36 corresponds to a single body into which the sub photo-detectors 34a and 34b are incorporated.

Here, the second optical unit 20 may further include an optical (element, for example, a hologram coupler (not shown)), which allows the proceeding paths of the second and third light beams 21a and 21b emitted at a predetermined distance from the twin light source 21 to be coincident. The hologram coupler transmits one of two light beams of different wavelengths incident at a predetermined distance and refracts the other one to allow the proceeding paths of the two light beams to be coincident. The hologram coupler would be disposed between the twin light source 21 and the plate-type beam splitter 25 or between the plate-type beam splitter 25 and the photo-detector 30. In a case where the photo-detector 30 includes the optical element to allow the proceeding paths of the second and third light beams 21a and 21b to be coincident, the photo-detector 30 may have a structure corresponding to the photo-detector 17 of the first optical unit 10.

As shown, the first collimating lens 18 is disposed between the first optical unit 10 and the first objective lens 45 and changes the first light beam 11a, which has been emitted as a divergent beam from the first optical unit 10, into a parallel beam to allow the parallel beam to be incident on the first objective lens 45. Where the first collimating lens 18 is used, the first objective lens 45 is designed to be optimum for the first light beam 11a as the parallel beam. The second collimating lens 23 is disposed between the second optical unit 20 and the second objective lens 41. The second collimating lens 23 changes the second and third light beams 21a and 21b, which have been emitted as divergent beams from the second optical unit 20, into parallel beams or almost parallel beams.

The compatible optical pickup of FIG. 1 includes the first and second collimating lenses 18 and 23 to allow the parallel beams or the almost parallel beams to be incident on the first and second objective lenses 45 and 41. However, it is understood that the compatible optical pickup may not include the first collimating lens 18 and/or the second collimating lens 23 or may include the first and/or second collimating lenses 18 and 23 to allow slightly convergent or divergent beams to be incident on the first and/or second objective lenses 45 and 41 so that an optical system used for at least one of the next generation DVD 1a, the DVD 1b, and the CD 1c is an infinite optical system.

Here, the optical structure of the optical unit of the compatible optical pickup of FIG. 1 is only an example. The optical unit is not limited to the optical structure of FIG. 1. In other words, the compatible optical pickup according to an aspect of the present invention includes two objective lenses 41 and 45, the single light source 11, and the twin light source 21, and other optical structures may be modified into various forms without departing from the spirit and scope of the spirit of the present invention.

It is preferable, but not required, that the first objective lens 45 is provided so as to form an optimum light spot used for recording on and/or reproduction from a high-density optical disc (i.e., the next generation DVD 1a). For example, when the first light source 11 emits the first light beam 11a with blue violet wavelength (for example, a wavelength of 405 nm), and the next generation DVD 1a has the thickness of about 0.1 mm, it is preferable that the first objective lens 45 has the NA of 0.85 or more. However, the NA can be adjusted according to the thickness of the DVD 1a, and the wavelength used.

It is preferable, but not required, that the second objective lens 41 is provided so as to form light spots used for recording on and/or reproduction from low-density optical discs (i.e., the DVD 1b and the CD 1c). In other words, it is preferable that the second objective lens 41 is optimized for the DVD 1b and is compatibly used for the CD 1c. However, it is understood that the second objective lens 41 need not be optimized for the DVD 1b so long as the second objective lens 41 is compatible for use in recording and/or reproducing with respect to the DVD 1b and CD 1c. As will be described later, the second objective lens 41 may be a lens on which a hologram pattern is formed according to the aspect of the invention. In this aspect, the hologram pattern is formed on at least a portion of one of two surfaces of the lens, and preferably at least a portion of a surface of the lens facing the optical unit so as to satisfy a optimum optical performance for the DVD 1b and the CD 1c. Alternately, the lens 41 can be separate from the holographic surface, or use non-holographic surfaces to achieve compatibility. Further, the lens 41 can have non-holographic surfaces to achieve compatibility or otherwise use different combinations of optical elements to achieve compatibility.

In the compatible optical pickup, it is preferable, but not required, that the first and second objective lenses 45 and 41 are installed in a single lens holder 50 to be driven by the single actuator 40. In this case, a relative tilt may occur between the first and second objective lenses 45 and 41 during assembling of the first and second objective lenses 45 and 41 into the single lens holder 50. Accordingly, it is preferable, but not required, that at least one of the first and second objective lenses 45 and 41 is manufactured so that a wavefront aberration occurring mainly due to a tilt of an objective lens and a wavefront aberration occurring mainly due to a tilt of light incident on the objective lens become the same type of wavefront aberration. For example, it is preferable, but not required, that at least one of the first and second objective lenses 45 and 41 is manufactured so that a wavefront aberration occurring mainly due to a tilt of an objective lens and a wavefront aberration occurring mainly due to a tilt of light incident on the objective lens become a coma aberration.

As is known in the optical field, a coma aberration occurs mainly due to a tilt of an objective lens, and an astigmatic aberration occurs mainly due to light incident on the objective lens at a predetermined angle. Accordingly, in a case of a general lens, although an incidence angle of light incident on the general lens is adjusted, it is impossible to compensate for a coma aberration occurring due to a tilt of the general lens. However, where at least one of the first and second objective lenses 45 and 41 is manufactured so that a wavefront aberration occurring mainly due to a tilt of an objective lens and a wavefront aberration occurring mainly due to light incident on the objective lens at an incident angle (i.e., a field angle) become the same type of wavefront aberration, it is possible to compensate for a wavefront aberration occurring due to a tilt of an objective lens by adjusting an incident angle at which light is incident on the objective lens.

Figure 5:
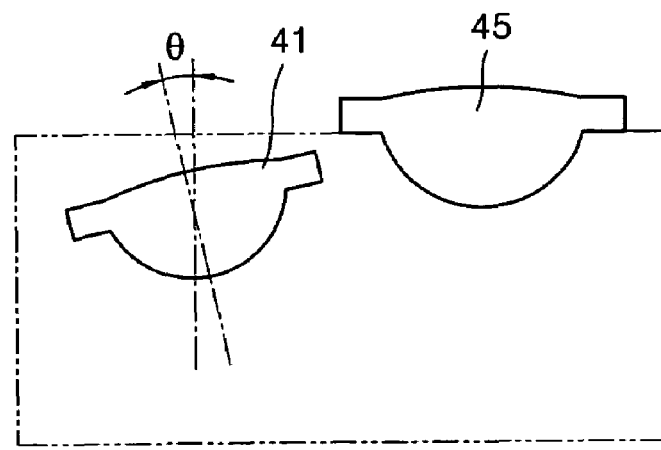
FIG. 5 is a view showing a case where the second objective lens tilts with respect to the first objective lens by θ due to an assembly error, in an optical pickup of FIG. 1.

For example, the second objective lens 41 is manufactured so as to compensate for the wavefront aberration occurring due to the tilt of the objective lens and the skew of the first objective lens 45 or the overall compatible optical pickup including the first objective lens 45 is adjusted to be suitable for the high-density next generation DVD 1a as shown in FIG. 5. As such, although the second objective lens 41 tilts with respect to the first objective lens 45 due to an assembly error, it is possible to compensate for a wavefront aberration occurring due to the tilt of the second objective lens 41. Here, the compensation for the wavefront aberration occurring due to the tilt of the second objective lens 41 is achieved in a process of moving the second optical unit 20 or the twin light source 21 within a plane perpendicular to the optical path through which the second and third light beams 21a and 21b pass to adjust angles at which the second and third light beams 21a and 21b are incident on the second objective lens 41.

As shown, the first objective lens 45 may be manufactured to compensate for a wavefront aberration occurring due to a tilt of a lens, and the skew of the second objective lens 41 or the overall compatible optical pickup including the second objective lens 41 may be adjusted to be suitable for the second objective lens 41. Also, a process of adjusting a skew to be suitable for one of the first and second objective lenses 45 and 41 may be omitted by using lenses capable of compensating for the wavefront aberration occurring due to the tilt of the lens as the first and second objective lenses 45 and 41.

In the compatible optical pickup having the above-described structure, it is possible to compensate for a wavefront aberration occurring due to a relative tilt between the first and second objective lenses 45 and 41. Therefore, even when the first and second objective lenses 45 and 41 are installed in the actuator 40 so as to keep the relative tilt therebetween, a high-quality reproduction signal can be obtained, as also occurs when the first and second objective lenses 45 and 41 do not tilt with respect to the optical disc 1.

Figure 6:
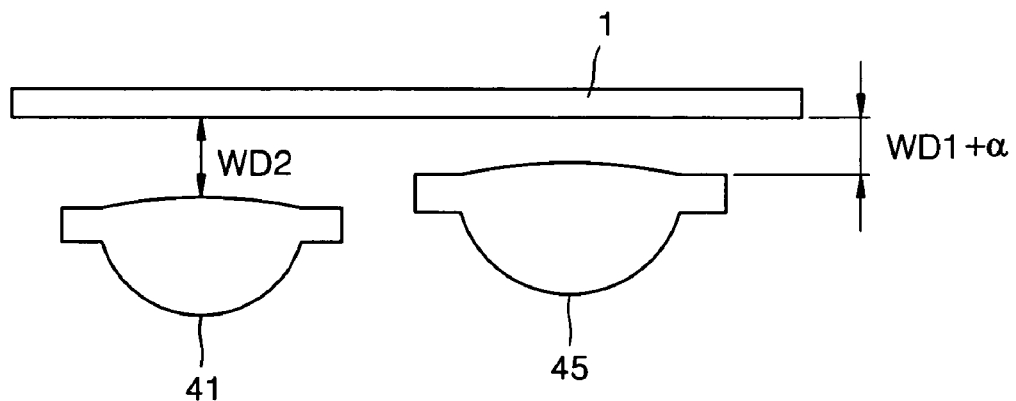
FIG. 6 is a view showing an example in which the first and second objective lenses of FIG. 1 are arrayed within a movement distance satisfying Equation 3.

In the compatible optical pickup according to an aspect of the present invention, the first and second objective lenses 45 and 41 are installed at different heights in consideration of their different working distances (i.e., distances above an upper surface of disc 1). Specifically, the lens holder 50 of the actuator 40 is formed to be suitable for the different heights of the first and second objective lenses 45 and 41. Preferably, the first and second objective lenses 45 are installed as shown in FIG. 6 to satisfy Equation 3 so that the first objective lens 45 having a short working distance cannot contact the optical disc 1 during loading of the optical disc 1 and/or operation of the second objective lens 41 within a long distance. In other words, it is preferable, but not required, that a basic separating distance between the first objective lens 45 and the optical disc 1 is greater than the movement distance (i.e., the working distance) of the first objective lens 45.

In Equation 3, WD1 denotes the movement distance of the first objective lens 45, WD2 denotes the movement distance of the second objective lens 41.

$$WD2 \geq WD1$$

Basic Separating Distance of First Objective Lens With Respect to Optical Disc = $WD1 + \alpha$ (3)

Where, $\alpha = |WD2 - WD1| \times (0.1 \sim 1.0)$.

Figure 7:
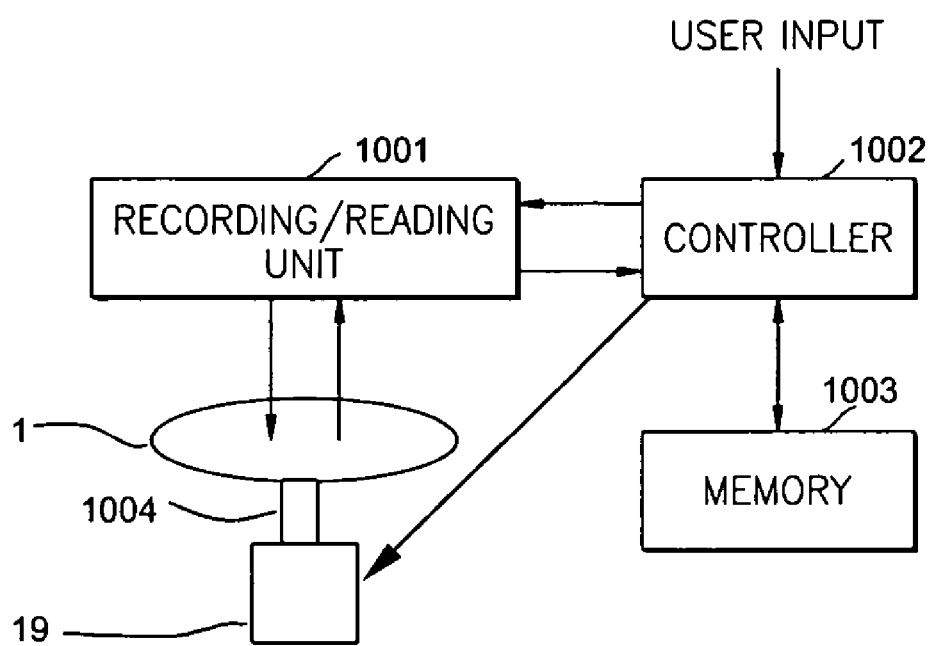
FIG. 7 is a block diagram of a recording and/or reproducing apparatus according to an embodiment of the present invention.

It is preferable, but not required, that the first and second objective lenses 45 and 41 are installed in a direction R corresponding to a radial direction of the optical disc 1. This direction is because the compatible optical pickup moves in an optical recording and/or reproducing apparatus (such as that shown in FIG. 7) in the radial direction of the optical disc 1 to perform recording and/or reproduction of an information signal. Where the first and second objective lenses 45 and 41 are disposed in parallel in the radial direction of the optical disc 1, it is preferable, but not required, that the first objective lens 45 for the high-density disc 1a is positioned at an inside diameter of the optical disc 1 compared to the second objective lens 41 for the low-density disc 1b or 1c in view of the compatibility with a cartridge for an existing recordable DVD 1b. However, it is understood that the first and second objective lenses 45, 41 need not be disposed radially and/or parallel with each other in all aspects of the invention.

Where the first and second objective lenses 45 and 41 are disposed in parallel in the radial direction of the optical disc 1, an optical recording and/or reproducing apparatus using the compatible optical pickup according to an aspect of the present invention such as that shown in FIG. 7 includes a spindle motor 19 smaller than an existing spindle motor to rotate the optical disc 1. The size of the spindle motor 19 allows the reading of information recorded in the outermost track during reproduction from the DVD 1b and/or the CD 1c using the second objective lens 41, which is positioned at an outer diameter of the optical disc 1 compared to the first objective lens 45.

As described above, where the first and second objective lenses 45 and 41a re disposed in parallel in the radial direction of the optical disc 1, it is preferable, but not required, that the first and second objective lenses 45 and 41 and the spindle motor 19 are aligned to harmonize phases of tracking signals at inner and outer perimeters of the compatible optical pickup.

Here, the arrangement of the first and second objective lenses 45 and 41 is not limited to the radial direction of the optical disc 1 and may be modified into various forms. For example, the compatible optical pickup according to an aspect of the present invention may include an axis perturbation actuator to dispose the first and second objective lenses 45 and 41 on appropriate positions in a switching way. Even when the axis perturbation actuator is used, it is preferable, but not required, that the basic separating distance between the first and second objective lenses 45 and 41 and the optical disc 1 satisfies Equation 3.

According to an aspect of the invention, the actuator 40 may be a biaxial actuator which moves a moving unit mounted in the first and second objective lenses 45 and 41 having different working distances in an optical axis direction and the radial direction of the optical disc 1 (i.e., a focusing direction and a tracking direction), or may be a triaxial actuator which performs a tilting movement in addition to biaxial movements.

In the compatible optical pickup according to an aspect of the present invention, it is preferable, but not required, that the actuator 40 is a single structure actuator in which the first and second objective lenses 45 and 41 are mounted in the single lens holder 50. In other words, the actuator 40 includes the single lens holder 50 which is formed to install the first and second objective lenses 45 and 41 having different working distances and a magnetic circuit 55 as shown in FIG. 2 which moves the first and second objective lenses 45 and 41 mounted on the single lens holder 50 in the focusing direction, the tracking direction, and/or the tilting direction.

It is preferable, but not required, that the single lens holder 50 is formed so that the first and second objective lenses 45 and 41 are installed to satisfy Equation 3 so as to prevent the first objective lens 45 having the short working distance from interfering with the optical disc 1 during initial loading of the optical disc 1 and/or the operation of the second objective lens 41 having the long working distance.

Also, it is preferable, but not required, that the single lens holder 50 is formed so as to install the first and second objective lenses 45 and 41 in the radial direction of the optical disc 1. This alignment is because the compatible optical pickup moves in the radial direction of the optical disc 1 in an optical disc drive to record an information signal on and/or reproducing the information signal from the optical disc 1.

It is preferable, but not required, that the single lens holder 50 is formed so as to dispose the first objective lens 45 at the inside diameter of the optical disc 1 compared to the second objective lens 41.

The compatible optical pickup according to an aspect of the present invention may also include two actuators. Each of the actuators includes one of the first and second objective lenses 45 and 41 such that the first and second objective lenses 45, 41 are separately driven.

FIG. 7 is a block diagram of a recording and/or reproducing apparatus using the compatible optical pickup shown in FIG. 1 according to an embodiment of the present invention. Referring to FIG. 7, the recording and/or reproducing apparatus includes a recording/reading unit 1001 including the compatible optical pickup, a controller 1002, a memory 1003, a turntable 1004 which receives the disc 1, and the spindle motor 19 which rotates the turntable 1004 according to the controller 1002. The recording/reading unit 1001 records and or reads data with respect to the disc 1, which is a received one of the next generation DVD 1a, DVD 1b, and CD 1c.

While not required in all aspects, it is understood that the controller 1002 can be a computer implementing the method of recording and/or reproducing using a computer program encoded on a computer readable medium. The computer can be implemented as a chip having firmware, or can be a general or special purpose computer programmable to perform the method.

As described above, in the compatible optical pickup according to aspects of the present invention, a skew of the first objective lens used for the next generation DVD can be adjusted to prevent the first objective lens from tilting with respect to the optical disc. Also, the second objective lens used for the DVD and the CD may be a lens which is manufactured to compensate for a wavefront aberration occurring due to a tilt thereof. Thus, in a case where a relative tilt between the first and second objective lenses occurs, angles at which the second light beam for the DVD and the third light beam for the are incident on the second objective lens can be adjusted to prevent an optical performance of the compatible optical pickup from deteriorating due to the relative tilt.

The compatible optical pickup according to an aspect of the present invention may have an optical structure in which the first objective lens is designed to be suitable for the next generation DVD and to compensate for a wavefront aberration occurring due to a tilt thereof like the second objective lens so as to omit a process of adjusting a skew.

An aspect of the compatible optical pickup may have an optical structure in which a skew of the second objective lens used for the DVD and/or the CD is adjusted to be coincident with an optical axis and the first objective lens used for the next generation DVD is designed so as to compensate for a wavefront aberration occurring due to a tilt thereof.

It has been described that the compatible optical pickup according to an aspect of the present invention includes the single light source used for the next generation DVD, the first objective lens suitable for the next generation DVD, the twin light source used for the DVD and the CD, and the second objective lens suitable for the DVD and the CD so as to be compatibly used for three types of optical discs with different recording densities (for example, the next generation DVD, the DVD, and the CD), to perform recording and/or reproduction. However, the compatible optical pickup according to aspects of the present invention is not limited to this and may be modified into various forms without departing from the spirit and scope of the present invention as defined by claims. For example, the compatible optical pickup according to aspects of the present invention may include a twin light source used for the next generation DVD and the DVD, an objective lens suitable for the next generation DVD and the DVD, a single light source used for the CD, and an objective lens suitable for the CD. Accordingly, the compatible optical pickup according to aspects of the present invention may be compatibly used for three types of recording media using two objective lenses and three light beams with different wavelengths.

When the two objective lenses are installed in consideration of their working distances with respect to a plurality of optical information storage media having different recording density and formats, an objective lens having a short working distance, can be prevented from crashing against an optical disc.

While the present invention has been particularly shown and described with reference to exemplary embodiments thereof, it will be understood by those of ordinary skill in the art that various changes in form and details may be made therein without departing from the spirit and scope of the present invention as defined by the following claims and equivalents thereof.

What is claimed is:

1. A compatible optical pickup which can be compatibly used for first through third recording media having different recording densities and formats, comprising:
   a first light source which emits a first light beam having a first wavelength suitable for the first recording medium;
   a twin light source which emits second and third light beams respectively having second and third wavelengths suitable for the corresponding second and third recording media;
   a plate-type beam splitter which transmits and reflects the second and third light beams in a predetermined ratio;
   a first objective lens which condenses the first light beam to form a light spot for recording and/or reproduction of the first recording medium;
   a second objective lens which condenses the second and third light beams to form light spots for recording and/or reproduction of the received one of the second and third recording media;
   an actuator which drives the first and second objective lenses;
   a first photo-detector which receives the first light beam reflected from the first recording medium to detect an information signal and/or an error signal; and
   a second photo-detector which receives the second and third light beams reflected from the received one of the second and third recording media to detect information signals and/or error signals,
   wherein the first objective lens forms a first numerical aperture for use with the first recording medium and a second numerical aperture other than the first numerical aperture for use with the second recording medium, the second objective lens forms a third numerical aperture which is other than the first and second numerical apertures for use with the third recording medium, WD1 is a working distance of one of the first and second objective lenses which has a short working distance, WD2 is a working distance of the other one of the first and second objective lenses which has a long working distance, the first and second objective lenses are installed to satisfy the below relationship so as to prevent the one objective lens having the short working distance from contacting the received one of the first through third recording media during loading of the received recording medium and while allowing operation of the other one of the first and second objective lenses having the long working distance:

$WD2 \geq WD1$, a basic separating distance of the one objective lens relative to the corresponding one of the first through third recording media is WD1+α, and α=|WD2−WD1|× (0.1~1.0), and at least one of the first and second objective lenses is formed so that a wavefront aberration occurring mainly due to a tilt of the objective lens and a wavefront aberration occurring mainly due to a tilt of light incident on the objective lens become a same type of aberration.

2. The compatible optical pickup of claim 1, wherein the actuator comprises:
a single lens holder to hold the first and second objective lenses; and
a magnetic circuit which drives the single lens holder in a direction.

3. The compatible optical pickup of claim 2, wherein the single lens holder holds the first and second objective lenses at different heights above a common surface.

4. The compatible optical pickup of claim 3, wherein one of the first through third recording media is a CD-family optical disc, another is a DVD-family optical disc, and the other is a next generation DVD-family optical disc which has a higher density than DVD.

5. The compatible optical pickup of claim 1, wherein one of the first through third recording media is a CD-family optical disc, another is a DVD-family optical disc, and the other is a next generation DVD-family optical disc which has a higher density than the DVD.

6. The compatible optical pickup of claim 1, wherein the second photo-detector comprises first and second main photo-detectors which receive the second and third light beams, respectively.

7. The compatible optical pickup of claim 6 further comprising:
a grating which diffracts the second and/or third light beams emitted from the twin light source into at least three beams,
wherein the second photo-detector further comprises a plurality of sub photo-detectors which receive sub beams split by the grating.

8. The compatible optical pickup of claim 1, wherein at least one of the first and second objective lenses is formed so that a wavefront aberration occurring mainly due to a tilt of the objective lens and a wavefront aberration occurring mainly due to a tilt of light incident on the objective lens become a coma aberration.

9. The compatible optical pickup of claim 1, wherein one of the first through third recording media is a CD-family optical disc, another is a DVD-family optical disc, and the other is a next generation DVD-family optical disc which has a higher density than the DVD.

10. The compatible optical pickup of claim 5, wherein the next generation DVD-family optical disc has a thickness of about 0.1 mm, is recorded and/or reproduced using a blue violet beam, and the one of the first and second objective lenses used for the next generation DVD-family optical disc has a numerical aperture of at or more than 0.85.

11. A recording and/or reproducing apparatus for use with first through third optical media having corresponding thicknesses comprising:
the compatible optical pickup of claim 1 which is compatible for recording and/or reproducing with respect to each of the first through third optical media; and
a controller to control the compatible optical pickup to record and/or reproduce data with respect to a received one of the first through third optical media.

12. A compatible optical system for use with recording and/or reproducing data with respect to a first optical medium having a first thickness, a second optical medium having a second thickness, and a third optical medium having a third thickness, the system comprising:
a first optical unit which emits a first light beam for use with the first optical medium and detects the first light beam reflected from the first optical medium, and emits a second light beam other than the first light beam for use with the second optical medium and detects the second light beam reflected from the second optical medium;
a first objective lens disposed in an optical pathway between the first optical unit and the received one of the first and second optical media and having an optical property which forms a light spot suitable for recording and/or reproducing data with respect to each of the first and second optical media;
a plate-type beam splitter which transmits and reflects the first and second light beams in a predetermined ratio;
a second optical unit which emits a third light beam other than the first and second light beams for use with recording and/or reproducing data with respect to the third optical medium and which detects the third light beam reflected from the third optical medium; and
a second objective lens disposed in an optical pathway between the second optical unit and which forms a light spot using the third light beam suitable for recording and/or reproducing data with respect to the third optical medium,
wherein the first through third light beams having corresponding different wavelengths corresponding to the first through third thicknesses,
the first objective lens forms a first numerical aperture for use with the first optical medium and a second numerical aperture other than the first numerical aperture for use with the second optical medium,
the second objective lens forms a third numerical aperture which is other than the first and second numerical apertures for use with the third optical medium
WD1 is a working distance of one of the first and second objective lenses which has a short working distance,
WD2 is a working distance of the other one of the first and second objective lenses which has a long working distance,
the first and second objective lenses are installed to satisfy the below relationship so as to prevent the one objective lens having the short working distance from contacting the received one of the first through third recording media during loading of the received recording medium and while allowing operation of the other one of the first and second objective lenses having the long working distance:

$$WD2 \geq WD1,$$

a basic separating distance of the one objective lens relative to the corresponding one of the first through third recording media is WD1+α, and α=|WD2−WD1|× (0.1~1.0), and at least one of the first and second objective lenses is formed so that a wavefront aberration occurring mainly due to a tilt of the objective lens and a wavefront aberration occurring mainly due to a tilt of light incident on the objective lens become a same type of aberration.

13. The compatible optical system of claim 12, wherein the third numerical aperture is not usable with the first and second optical media.

14. The compatible optical system of claim 13, wherein the third numerical aperture is greater than 0.6, and the first and second numerical apertures are at or less than 0.6.

15. The compatible optical system of claim 12, further comprising a common actuator system that moves the first and second objective lenses simultaneously.

16. The compatible optical system of claim 12, wherein:
the second working distance is greater than the first working distance by a working distance difference, and
the first objective lens is disposed at a basic separating distance relative to an upper surface of the received one of the first and second optical media that is at or between 10% and 100% of the working distance difference greater than the first working distance.

17. The compatible optical system of claim 12, wherein the optical property of the first objective lens comprises a holographic pattern which has a first numerical aperture with respect to the first light beam having a first wavelength for use in recording and/or reproducing data with respect to the first optical medium, and a second numerical aperture with respect to the second light bean having a second wavelength other than the first wavelength for use in recording and/or reproducing data with respect to the second optical medium.

18. The compatible optical system of claim 12, wherein:
the optical property of the first objective lens is optimized for recording and/or reproducing with respect to the first optical recording medium and is usable for recording and/or reproducing with respect to the second optical medium, and
the second objective lens is optimized for use with the third recording medium.

19. The compatible optical system of claim 18, wherein the first recording medium is a Digital Versatile Disc (DVD), the second recording medium is a Compact Disc (CD), and the third recording medium has a thickness which is less than a thickness of the DVD.

20. The compatible optical system of claim 19, wherein the third light beam has a wavelength that is less than a wavelength of the first light beam.

21. The compatible optical system of claim 20, wherein the wavelength of the third light beam is substantially 405 nm.

22. The compatible optical system of claim 18, wherein:
the first recording medium is a Digital Versatile Disc (DVD),
the second recording medium is a Compact Disc (CD),
the first objective lens has a first numerical aperture using the first light beam for use with recording and/or reproducing with respect to the DVD and has a second numerical aperture for use with recording and/or reproducing with respect to the CD, and the second objective lens has a third numerical aperture which is at or substantially equal to 0.85 using the third light beam for use with recording and/or reproducing with respect to the third recording medium.

23. The compatible optical system of claim 12, wherein one of the first and second objective lenses has an optical property which converts into a common aberration wavefront aberrations due to a tilt of the one objective lens and due to an angle an optical axis of the one objective lens and an optical pathway of an incident one of the first through third light beams on the one objective lens.

24. The compatible optical system of claim 23, wherein the optical system compensates for the common aberration by moving a light emitting portion of the corresponding one of the first and second optical units within a plane perpendicular to the corresponding optical pathway.

25. A recording and/or reproducing apparatus for use with first through third optical media having corresponding thicknesses comprising:
the compatible optical pickup of claim 12 which is compatible for recording and/or reproducing with respect to each of the first through third optical media; and
a controller to control the compatible optical pickup to record and/or reproduce data with respect to a received one of the first through third optical media.

26. A compatible optical system for use with recording and/or reproducing data with respect to a first optical medium having a first thickness and a second optical medium having a second thickness, the system comprising:
a first optical unit which emits a first light beam for use with the first optical medium and detects the first light beam reflected from the first optical medium;
a first objective lens disposed in an optical pathway between the first optical unit and the received one of the first and second optical media and having an optical property which forms a light spot suitable for recording and/or reproducing data with respect to the first second optical medium;
a second optical unit which emits a second light beam other than the first light beam for use with recording and/or reproducing data with respect to the second optical medium and which detects the second light beam reflected from the second optical medium;
a second objective lens disposed in an optical pathway between the second optical unit and the received one of the first and second optical media and which forms a light spot using the second light beam suitable for recording and/or reproducing data with respect to the second optical medium; and
a holding unit which disposes the first objective lens at a first working distance relative to the first optical medium, and disposes the second objective lens at a basic operating distance relative to the second optical medium which is greater than a second working distance through which the second objective lens is moved during recording and/or reproducing of the second optical medium so as to prevent the second objective lens from impacting the first optical medium during recording and/or reproduction of the first optical medium,
wherein the first working distance is greater than the second working distance,
a triaxial actuator which moves a moving unit in the first and second objective lenses in any of an optical axis direction, a radial direction and a tilting direction WD1 is the first working distance of the first objective lens which has a short working distance, WD2 is the second working distance of the second objective lens which has a long working distance, the first and second objective lenses are installed to satisfy the below relationship so as to prevent the first objective lens from contacting the received one of the first through third recording media during loading of the received recording medium and while allowing operation of the second objective lens:

$$WD2 \geq WD1,$$

a basic separating distance of the one objective lens relative to the corresponding one of the first through third recording media is WD1+α, and α=|WD2−WD1|× (0.1~1.0), and at least one of the first and second objective lenses is formed so that a wavefront aberration occurring mainly due to a tilt of the objective lens and a wavefront aberration occurring mainly due to a tilt of light incident on the objective lens become a same type of aberration.

27. The compatible optical system of claim 26, wherein the basic separating distance is relative to an upper surface of the received one of the first and second optical media that is at greater than the second working distance by at or between 10% and 100% of a difference between the first and second working distances.

28. The compatible optical system of claim 26, wherein the triaxial actuator comprises a first actuator to drive the first objective lens and a second actuator to drive the second objective lens.

29. The compatible optical system of claim 26, wherein the holding unit is formed so as to install the first and second objective lenses in the radial direction of the optical disc.

30. The compatible optical system of claim 12 further comprising:

a grating which diffracts the first and/or second light beams emitted from the first optical unit into at least three beams; and first and second photo-detectors for detecting the first and second light beams, respectively, the photo-detectors comprising a plurality of sub photo-detectors which receive sub beams split by the grating.

31. The compatible optical pickup of claim 7, further comprising a sensing lens disposed between the plate-type beam splitter and the photo-detector and focuses the first light beam onto the photo-detector.

* * * * *

UNITED STATES PATENT AND TRADEMARK OFFICE
CERTIFICATE OF CORRECTION

| | | |
|---|---|---|
| PATENT NO. | : 7,505,390 B2 | Page 1 of 1 |
| APPLICATION NO. | : 10/786073 | |
| DATED | : March 17, 2009 | |
| INVENTOR(S) | : Tae-youn Heor et al. | |

It is certified that error appears in the above-identified patent and that said Letters Patent is hereby corrected as shown below:

Column 15, Line 39, change "bean" to --beam--.

Column 16, Line 39, change "first second" to --first--.

Signed and Sealed this

Sixteenth Day of June, 2009

JOHN DOLL
*Acting Director of the United States Patent and Trademark Office*